United States Patent Office 3,720,505
Patented Mar. 13, 1973

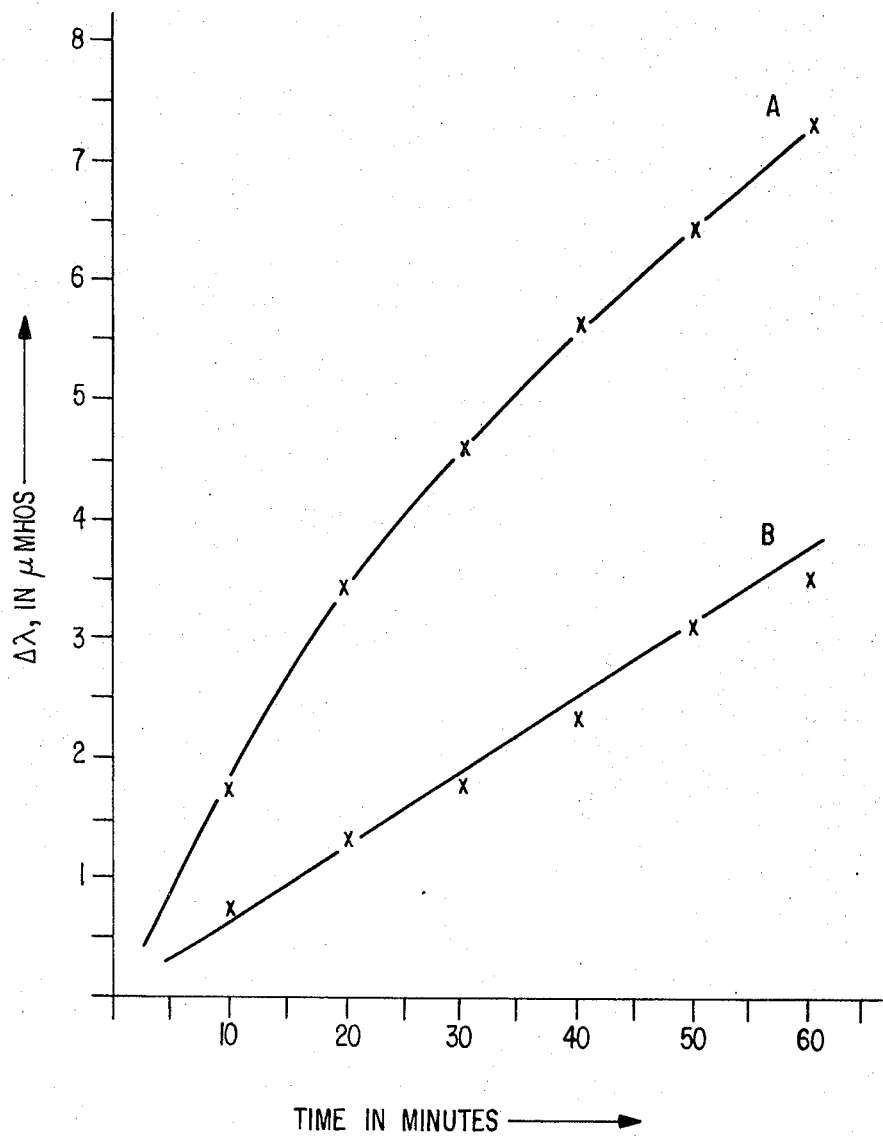

3,720,505
METHOD OF FORMING A PHOSPHATE GLASS TO INOCULATE WATER
Hans Vogel, Ludwigshafen-Mundenheim, Germany, assignor to Gebr. Giulini GmbH, Ludwigshafen am Rhine, Germany
Filed Dec. 9, 1970, Ser. No. 96,509
Int. Cl. C03b 19/10
U.S. Cl. 65—21                    7 Claims

ABSTRACT OF THE DISCLOSURE

A method for inoculating water with $P_2O_5$. A phosphate glass melt containing $Na_2O$, $CaO$, and $MgO$ and having a base to acid ratio greater than 1.5:1.0 is brought to a temperature of at least 1200° C. and then cooled to form a glass. This glass is placed in the water to be inoculated, where the $P_2O_5$ goes slowly into solution.

BACKGROUND OF THE INVENTION

The present invention relates to the phosphate-inoculation of water using extremely slowly dissolving polyphosphate glasses containing $Na_2O$, $CaO$, and $MgO$, and in some cases $SiO_2$.

The polymeric phosphates of the alkalis have become especially important in the chemistry of water. Their large range of applicability is founded on the size of their electrical charge density, which influences the behavior in solution of other cations for purely electrostatic reasons. One property which is especially well known and used in technology is the ionic interaction with the water hardeners $Ca^{+2}$ and $Mg^{+2}$, which form complex-like addition compounds with the polyphosphate chains. The relative effect of the polymeric phosphates on the cations of the second group of the periodic system increases with increasing dilution of the phosphate solution. Expressed thermodynamically, the free energy change for the reaction becomes more negative. Thus it can be understood why such addition compounds are present even at such high dilutions as between 1 and 5 milligrams $P_2O_5$ per liter of water. On a mol basis, this is around a $1 \times 10^{-5}$ molal aqueous solution of phosphate.

A water treatment founded on the formation of these addition compounds is known as the inoculation process or the threshold treatment. Phosphate is added to drinking and utility water in a concentration of from 1 to 5 milligrams $P_2O_5$ per liter of water, in order to prevent the universally known and bothersome precipitation of the water hardeners within water conducting systems.

Inoculation of water with such small amounts of polyphosphate is done using metering devices for feeding determined amounts of concentrated solution into the water, or it is done by conducting the water over limitedly soluble $Na_2O$-$CaO$-$MgO$-polyphosphate glasses. Sometimes these glasses also contain silicate. Pieces of the glass are placed in sluices through which the water is conducted.

An example of an inoculating process using glass is set forth in West German Pat. No. 976,867. There, $Na_2O$-$CaO$-$MgO$-polyphosphate glasses, possibly containing $SiO_2$, are described which may be melted from a mixture of the primary sodium phosphate, $NaH_2PO_4$, with MgO and CaO at 800 to 900° C. Silicate can be added to the resulting clear melt. Cooling of this melt yields a slowly dissolvable polyphosphate. When water is conducted through sluices containing pieces of this polyphosphate, the desired quantities of 1 to 5 milligrams of $P_2O_5$ per liter of water are given off. By selecting a determined average diameter for the glass pieces and by installing sluices of a given size, it is possible to obtain a uniform $P_2O_5$ concentration for a given water flow rate. However, if the water comes to rest in the sluices, control over the phosphate concentration in the water is lost. First, there is a steady increase in the $P_2O_5$ concentration in the water resting in the sluices, which increase is approximately proportional to time, then a certain saturation level is reached. The solution rate of the glasses of West German Pat. No. 967,867 and all other glass-like polyphosphates on the market are unfavorably high for allowing control of phosphate concentration to be maintained in the face of decreasing water flow rate. This is due to their limited average polymer chain lengths.

In the inoculation of drinking water, the use of larger amounts of $P_2O_5$ than required is fundamentally undesired and is to be prevented for economic reasons. Yet with the phosphate glasses that have been available, it has always been necessary to accept a phosphate concentration in drinking water considerably over the desired concentration of between 1 and 5 milligrams $P_2O_5$ per liter for a short time after restarting, after a period of shutdown, water flow through sluices containing the glasses.

SUMMARY OF THE INVENTION

In view of the above-described situation, it is an object of the present invention to provide a method for inoculating water by passing it through $Na_2$-$CaO$-$MgO$-polyphosphate glasses having a significantly smaller rate of dissolution while nevertheless permitting the achievement of the desired $P_2O_5$ concentrations of between 1 and 5 milligrams per liter of water.

This as well as other objects which will become apparent in the discussion that follows are achieved, according to the present invention, by heating a phosphate glass melt mixture containing $Na_2O$, $CaO$, and $MgO$ and having a base to acid ratio greater than 1.5:1.0 to a temperature of at least 1200° C., solidifying the resulting melt to form a glass, and placing this resulting glass in water to be inoculated.

BRIEF DESCRIPTION OF THE DRAWING

The sole figure of the drawing is a plot of experimental data obtained with two glasses according to the invention.

DESCRIPTION OF THE PREFERRED EMBODIMENTS

The polyphosphate glass of the present invention is prepared from a mixture of $P_2O_5$, $Na_2O$, $CaO$, and $MgO$. $SiO_2$ may also be present in the mixture.

The base to acid ratio in the melt mixture of the present invention is greater than 1.5:1.0. This ratio in previous polyphosphate glasses has been about 1.35:1.0. This ratio is determined for a given mixture by dividing the sum of the mols of the basic oxides $Na_2O$, $CaO$, and MgO by the sum of the mols of the acid oxides $P_2O_5$ and $SiO_2$.

However, this higher base to acid ratio is not alone sufficient to achieve the objects of the present invention. It has been further found that it is necessary to heat the melt mixture to at least 1200° C. This decreases the residual water content in the resulting glass. Residual water has the disadvantageous effect of decreasing the polyphosphate chain length. It has been found that, by heating to 1200° C. instead of the previously conventional temperature range of 800 to 900° C., the residual water content is reduced from 0.40 weight-percent to less than 0.20 weight-percent.

As has been surprisingly discovered during X-ray diffraction analyses, heating to 1200° C. has the additional advantage that any $SiO_2$ present in the melt mixture is then completely incorporated into the resulting glass-structure. Thus, no diffraction from crystalline $SiO_2$ is noted in a glass made according to the method of the present invention. This is a very important advantage which contributes to achieving the objects of the present invention, since incomplete incorporation of $SiO_2$ also has the effect of reducing the otherwise obtainable polyphosphate chain lengths in the glass product.

When a polyphosphate glass is produced using the above-described directives of the present invention as to base to acid ratio and melting temperature, it is found to have a rate of dissolution about ⅓ that of the previous polyphosphate glasses. In addition, the polyphosphate glasses of the present invention have a smaller temperature dependence in their dissolution rates in water, as compared with previous polyphosphate glasses.

It has additionally been found that the dissolution rates of the sodium-calcium-phosphate glasses of the present invention can be still further reduced by interrupting the cooling of the melt for about thirty minutes in the transformation range. By this holding of the glasses at a temperature in the transformation range, the residual stresses which otherwise contribute to their solubility are substantially eliminated. This treatment results in a fall in solubility.

The invention is further illustrated by the following examples:

Example Ia

As an example of the previous technology, a mixture of the following composition was prepared:

| | Wt.-percent |
|---|---|
| $Na_2O$ | 25.7 |
| MgO | 4.4 |
| CaO | 6.4 |
| $SiO_2$ | 1.5 |
| $P_2O_5$ | 62.0 |

This mixture was melted at 850° C. The mol ratio base to acid amounts to 1.37:1.00. The resulting glass exhibited a dissolution rate characterized by a $P_2O_5$ concentration equal to 76.5 milligrams $P_2O_5$ per liter of water after pieces of the glass of given size had remained in a given quantity of motionless water for two hours at 20° C. The residual water content of the resulting glass amounted to 0.4 weight-percent. This polyphosphate glass, in a particle size of 9 to 10 milliameters, was placed in a sluice and water was caused to flow through the sluice at the rate of 100 liters per hour. This water attained a $P_2O_5$ concentration of 1.0 to 1.7 milligrams $P_2O_5$ per liter of water.

Example Ib

As an example of the present invention, a mixture of the following composition was prepared:

| | Wt.-percent |
|---|---|
| $Na_2O$ | 23.5 |
| MgO | 4.7 |
| CaO | 10.3 |
| $SiO_2$ | 1.9 |
| $P_2O_5$ | 59.6 |

This mixture was melted at 1200° C. The mol ratio base to acid amounts to 1.51:1.00. The resulting glass exhibited a dissolution rate characterized by a $P_2O_5$ concentration equal to 22.5 milligrams $P_2O_5$ per liter of water, as measured under exactly the same conditions as used in the measurement of the dissolution rate for the glass of Example Ia. The residual water content of the glass of this Example Ib amounted to 0.18 weight-percent. Under exactly the same experimental conditions as used for the flowing water test described in Example Ia, the glass of this Example Ib caused the water to attain a $P_2O_5$ concentration of 1.0 to 1.3 milligrams $P_2O_5$ per liter of water.

It was further found that the dissolution rate of the sodium-calcium-phosphate glass of this Example Ib was decreased to about half of the 22.5-value given above, if it was held during cooling at a temperature in its transformation range of between 400 and 600° C.

Glasses of the type represented by this Example Ib can be compression molded into uniformily shaped pieces, the particular shape obtained depending on the shape of the mold used. The pressing of spherically shaped pieces has proven particularly successful.

Example II

A melt mixture having the composition given in Example Ib was heated to 1200° C. It was then poured into an iron pan, where it cooled and solidified. The resulting glass was removed from the pan and placed in a glass beaker. Then, another melt mixture, also having the composition given in Example Ib, was heated to 1200° C. and allowed to cool to a forming viscosity, whereupon it was formed into spheres. At 500° C., these spheres were held in a soaking furnace for 30 minutes. A quantity of these spheres sufficient to give a total surface area equal to the surface of the glass cooled in the iron pan was placed in a second beaker. An equal quantity of ion-free water was filled into each of the beakers. Each beaker was provided with a stirrer of a given size and shape; these stirrers were operated at the same speed so as to provide equal circulation conditions in each beaker. In the case of each beaker, the conductivity increase, $\Delta\lambda$, in micromhos, was measured from the time of introduction of the water. The conductivity increase is directly proportional to the amount of $P_2O_5$ in solution. The results of these measurements is shown in the sole figure, where curve A for the glass formed in the iron pan exhibits a dissolution rate (slope of the curce) roughly twice that of curve B for the glass soaked in the transformation range.

In the present invention, it is always desired that the amount of $P_2O_5$ inoculated into the water be below stoichiometric. By this is meant that, the amounts of polyphosphates are substantially less than required to stoichiometrically combine with the calcium in the water. In general, only a few parts of the polyphosphate per million parts of water are employed, say of the order of up to 10 or 20 parts per million of water. This constitutes only ⅟₁₀₀ to ⅟₁₀₀₀ or ⅟₂₀₀₀ of the stoichiometric amount required for reaction with the calcium to tie it up in a soluble complexion. These small amounts of very slowly soluble polyphosphate are usually designated "threshold amounts" and the process of treating water wherein these small amounts are employed "threshold treatment."

It will be understood that the above description of the present invention is susceptible to various modifications, changes and adaptations, and the same are intended to be comprehended within the meaning and range of equivalents of the appended claims.

I claim:

1. A method for inoculating water with $P_2O_5$, comprising heating a phosphate glass melt mixture containing, in addition to $P_2O_5$, $Na_2O$, CaO, and MgO and having a base to acid ratio greater than 1.5:1.0 to a temperature of at least 1200° C., solidifying the resulting melt to form a glass, holding the resulting glass in the transformation range of the glass for at least 30 minutes, and placing said glass in said water.

2. A method as claimed in claim 1, wherein the melt mixture contains $SiO_2$.

3. A method as claimed in claim 2, wherein the step of solidifying includes cooling the melt to a viscosity for forming, and pressing spheres from the melt at forming viscosity; the resulting spheres being subjected to the step of holding.

4. A method as claimed in claim 2, wherein the melt mixture consists essentially of the following composition:

| | Wt.-percent |
|---|---|
| $Na_2O$ | 23.5 |
| MgO | 4.7 |
| CaO | 10.3 |
| SiO | 1.9 |
| $P_2O_5$ | 59.6 |

5. A method as claimed in claim 4, wherein, in the step of holding, the resulting glass is held at 500° C. for at least 30 minutes.

6. A method as claimed in claim 1, the step of heating to a temperature of at least 1200° C. having the function of yielding a residual water content in the resulting glass of below 0.2 weight-percent.

7. A method as claimed in claim 2, the step of heating to a temperature of at least 1200° C. having the functions of yielding a residual water content in the resulting glass of below 0.2 weight-percent and of completely incorporating the $SiO_2$ into the resulting glass structure.

References Cited
UNITED STATES PATENTS

| 462,083 | 10/1891 | Leighton | 65—21 |
| 1,585,542 | 5/1926 | Henry | 65—117 |

FOREIGN PATENTS 976,867  7/1964  Germany.

ARTHUR D. KELLOGG, Primary Examiner

U.S. Cl. X.R.
65—117; 71—45